(12) United States Patent
Tasker

(10) Patent No.: US 9,009,766 B2
(45) Date of Patent: Apr. 14, 2015

(54) OPTIMIZATION OF VIDEO FOR WIRELESS DELIVERY

(75) Inventor: Michael Edric Tasker, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 13 days.

(21) Appl. No.: 13/441,570

(22) Filed: Apr. 6, 2012

(65) Prior Publication Data

US 2013/0268981 A1    Oct. 10, 2013

(51) Int. Cl.
*H04N 7/173* (2011.01)
*H04N 21/4363* (2011.01)
*H04N 21/61* (2011.01)

(52) U.S. Cl.
CPC ..... *H04N 21/43637* (2013.01); *H04N 21/6131* (2013.01)

(58) Field of Classification Search
None
See application file for complete search history.

(56) References Cited

U.S. PATENT DOCUMENTS

| 6,754,232 | B1 | 6/2004 | Tasker | |
| 6,785,239 | B1 | 8/2004 | Tasker | |
| 7,143,432 | B1 * | 11/2006 | Brooks et al. | 725/105 |
| 7,286,492 | B1 | 10/2007 | Tasker | |
| 7,558,246 | B2 | 7/2009 | Tasker | |
| 2002/0021761 | A1 * | 2/2002 | Zhang et al. | 375/240.27 |
| 2004/0034876 | A1 * | 2/2004 | Schilling | 725/144 |
| 2009/0288129 | A1 * | 11/2009 | Wolfe et al. | 725/116 |

* cited by examiner

*Primary Examiner* — Cai Chen
(74) *Attorney, Agent, or Firm* — Cindy Kaplan

(57) ABSTRACT

In one embodiment, a method includes receiving at a network device interposed in a network path between a source and a receiver, video optimized for a wired network link located between the source and the network device, identifying the receiver as a wireless device, optimizing the video for wireless transmission, and transmitting the video optimized for wireless transmission to the receiver. An apparatus is also disclosed.

20 Claims, 3 Drawing Sheets

OPTIMIZATION OF VIDEO FOR WIRELESS DELIVERY

TECHNICAL FIELD

The present disclosure relates generally to communication networks, and more particularly, optimization of video for wireless delivery.

BACKGROUND

Video consumes a large amount of network bandwidth. Video coding settings are typically negotiated end-to-end to fit within the most bandwidth constrained network link within a network path. An increasing number of endpoints are connecting to networks via wireless links, which suffer from bursty loss of data due to radio interference and overcrowding of wireless networks.

BRIEF DESCRIPTION OF THE FIGURES

Corresponding reference characters indicate corresponding parts throughout the several views of the drawings.

DESCRIPTION OF EXAMPLE EMBODIMENTS

Overview

Figure 1:
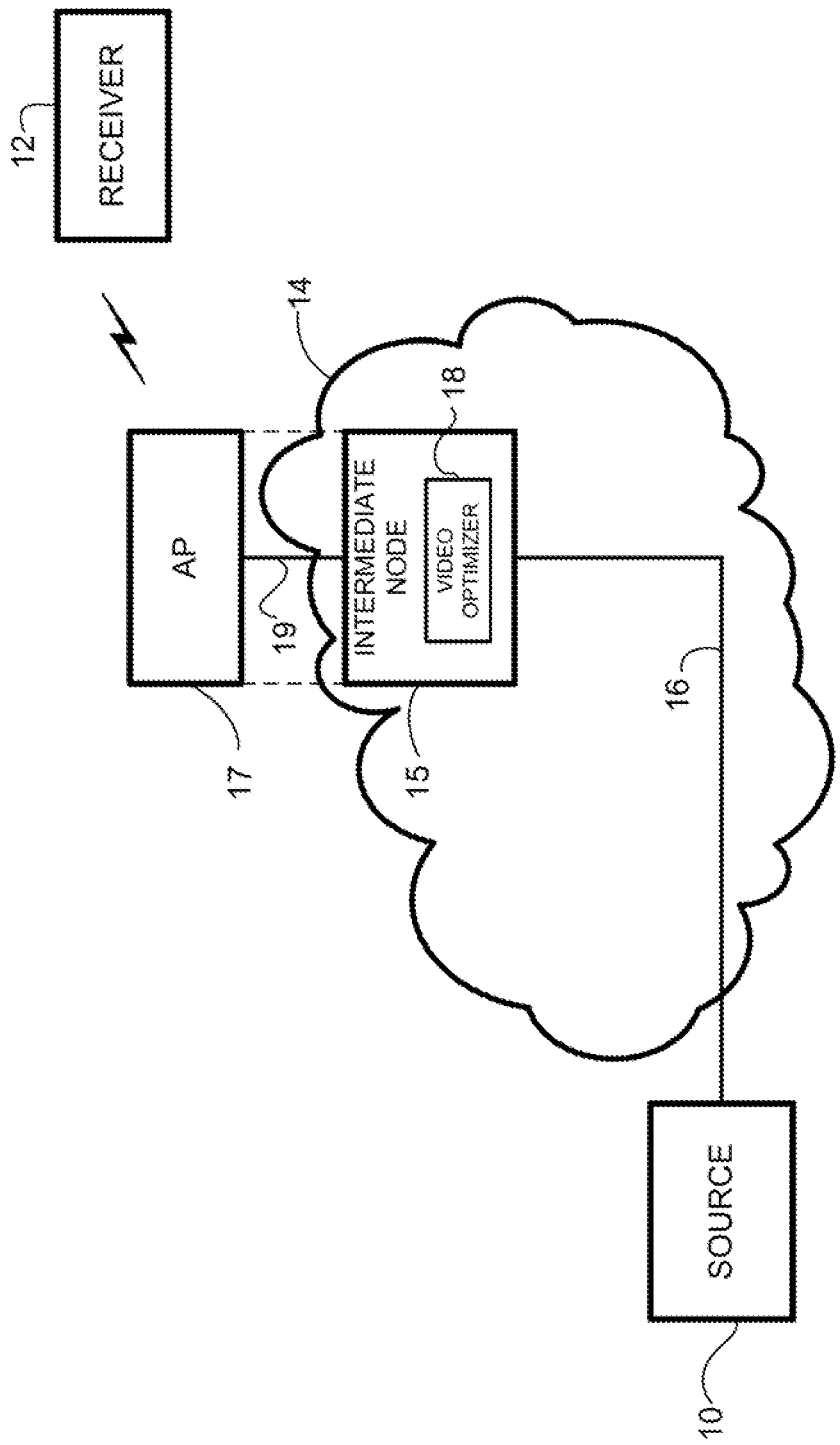
FIG. 1 illustrates an example of a network in which embodiments described herein may be implemented.

In one embodiment, a method generally comprises receiving at a network device interposed in a network path between a source and a receiver, video optimized for a wired network link located between the source and the network device, identifying the receiver as a wireless device, optimizing the video for wireless transmission, and transmitting the video optimized for wireless transmission to the receiver.

In another embodiment, an apparatus generally comprises a processor for processing video received from a source on a wired network link and optimized for transmission on the wired network link, and identifying a receiver of the video as a wireless device. The apparatus further comprises a video encoder for optimizing the video for wireless transmission.

In yet another embodiment, an apparatus generally comprises a wired network interface for receiving video optimized for a wired network link from a source, a video optimizer for identifying a receiver of the video as a wireless device and optimizing the video for wireless transmission, and a second network interface for transmitting the video optimized for wireless transmission to the receiver.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

The embodiments described herein may be used to reformat or re-encode video received from a source over a wired network to optimize the video for delivery to a receiver over a wireless network on a final portion of a network path between the source and receiver. For example, the source may optimize the video based on the most bandwidth constrained portion of the network path, which may be a wired network segment nearest to the source. An intermediate node located within the network path, performs video optimization specific to a wireless segment of the network path.

As described in detail below, the intermediate node is operable to identify the receiver as a wireless client device or recognize that a segment of the network path between the intermediate node and receiver is in a wireless network. If the intermediate node determines that video parameters selected by the source for the wired network are not optimal for use in delivering the video over the wireless network, the node may modify the video (e.g., reformat or re-encode) to optimize the video for delivery over the wireless network. Since the wireless network typically has different requirements for optimization than a wired network, the video can be optimized for a specific portion of the network path. The embodiments remove the conflict between the need to optimize video to fit into a bandwidth constrained wired link and at the same time allow for optimization of the video for delivery over a wireless network.

Referring now to the drawings, and first to FIG. 1, an example of a network in which embodiments described herein may be implemented is shown. For simplification, only a small number of network elements are depicted. The network includes a communication system comprising a media source 10 and receiver 12 in communication over a network 14. The network 14 may include one or more networks (e.g., local area network, wireless local area network, cellular network, metropolitan area network, wide area network, satellite network, Internet, intranet, radio access network, public switched network, virtual private network, or any other network or combination thereof).

The endpoints 10, 12 are configured to originate or terminate communications over the network. In one example, the source 10 is a source of a video and the receiver 12 is a receiver of the video in a media (video) session. The endpoints 10, 12 may comprise any device or combination of devices configured for receiving, transmitting, or receiving and transmitting media flows (e.g., video streams). Media may include, for example, video, images, graphics, text, audio, or other data or combination thereof. The media transmitted from the source 10 may be encrypted, compressed, or encoded according to any format. For simplification, only two endpoints 10, 12 are shown in FIG. 1, however, the communication system may include any number of endpoints 10, 12.

The media source 10 may be, for example, a server that stores the media locally or receives the media from another server or media source via another network, satellite, cable, or any other communication device. The receiver (wireless device) 12 may be any suitable equipment that supports wireless communication, including for example, a cellular phone, personal digital assistant, laptop computer, tablet, multimedia device, and the like.

The source node 10 and receiver node 12 are connected via communication links and one or more intermediate nodes (network device) 15. The intermediate node 15 receives media from the source 10 and forwards it to the receiver 12.

For simplification, only one network device 15 is shown, however, the media flow path between the source 10 and receiver 12 may include any number or type of network devices (e.g., routers, switches, gateways, access points, base stations, or other network devices), which facilitate passage of data between the endpoints. The network device 15 is interposed in the network path between the source 10 and receiver 12. As described below, a segment of the network path between the source 10 and intermediate node 15 comprises a wired network link and a segment between the intermediate node and the receiver 12 includes a wireless network path.

Network link 16 between the source and intermediate node 15 comprises a bandwidth constrained connection (e.g., wide area network (WAN) link). The link 16 may comprise, for example, a T1 or DSL (Digital Subscriber Line) communication path or other wired network path that runs at about a 1-2 Mbit/sec line rate. It is to be understood that only a portion of the network path between the source 10 and the intermediate node 15 may contain the bandwidth constrained connection. The video bandwidth settings are initially negotiated between the source 10 and receiver 12 so as to fit within the most bandwidth constrained network link within the network path between the source and receiver.

The receiver 12 may be located, for example, at a branch office and configured to perform wireless communication according to a wireless network communication protocol such as IEEE 802.11 or other wireless transmission protocol. In the example shown in FIG. 1, the receiver 12 is in communication with an access point 17 in communication with the intermediate node 15. The intermediate node may communicate with the access point over a wired network link 19 (FIG. 1) or the intermediate node 15 may be integral with the access point 17 (as indicated at dashed lines between the intermediate node and access point), in which case the intermediate node/access point is in wireless communication with the receiver 12. The receiver 12 may also communicate with a base station (not shown), which connects to a wired data network and serves as a gateway or access point through which the receiver 12 has access to the network 14.

As noted above, the network path between the intermediate node 15 and the receiver 12 may comprise a wired segment and a wireless segment. The wired segment is preferably not highly bandwidth constrained like the wired network link 16 between the source 10 and intermediate node 15, so that the video optimized for wireless delivery does not cause congestion on the wired segment.

The receiver 12 includes one or more antenna for wireless communication (e.g., Wi-Fi, 3G/4G (third generation/fourth generation of cellular wireless standards)), or other wireless standards or protocols. The wireless segment between the intermediate node 15 and receiver 12 may operate, for example, with a bandwidth of about 50-100 Mbit/sec. The wireless network path has more bandwidth capability than the bandwidth constrained wired network link between the source and intermediate node, however, the wireless network is more likely to drop packets. Therefore, optimization of video for wireless transmission includes encoding or formatting video for protection from data loss or errors that are more likely to occur in the wireless network.

The intermediate node 15 is a network device such as a router (e.g., integrated services router), switch, gateway, access point, or other network device or combination thereof. As described below, the intermediate node 15 comprises a video optimizer 18 configured to optimize (re-optimize) video received from the source 10 for delivery to the receiver 12 over a wireless network. The intermediate node 15 may operate as a proxy for the endpoint in the optimization of the video. For example, the intermediate node 15 may receive session information and video parameters using protocols such as SDP (Session Description Protocol), SIP (Session Initiation Protocol), RTSP (Real Time Streaming Protocol), etc. Control data or video parameters may be received from one of the endpoints or another node in the network path. The intermediate node 15 may negotiate with the receiver 12 or communicate one or more optimization or video parameters to the receiver, and may perform other operations such as updating RTP (Real-time Transport Protocol) sequence numbers, for example.

The video optimizer 18 comprises a video encoder (e.g., software program, hardware device, or combination thereof) for encoding (compressing) the video frames. The video optimizer 18 may also include a decoder for decoding video received from the source 10. The video received from the source 10 may also be encrypted, in which case the optimizer 18 is configured to obtain encryption keys (e.g., from call manager) and decrypt the video. The video optimizer 18 is operable to reformat or re-encode the video for transmission over the wireless network to add greater protection and quality of experience in the expectation that bursty wireless data loss is likely to occur. The optimizer 18 may be configured, for example, to add redundant copies of critical video packets, add forward error correction, or re-encode video to minimize the amount of interframe dependencies in the video so that if individual video frames are lost, there is reduced impact to subsequent video frames.

It is to be understood that the network shown in FIG. 1 and described herein is only an example and that the embodiments may be implemented in networks having different network topologies or network devices, without departing from the scope of the embodiments.

Figure 2:
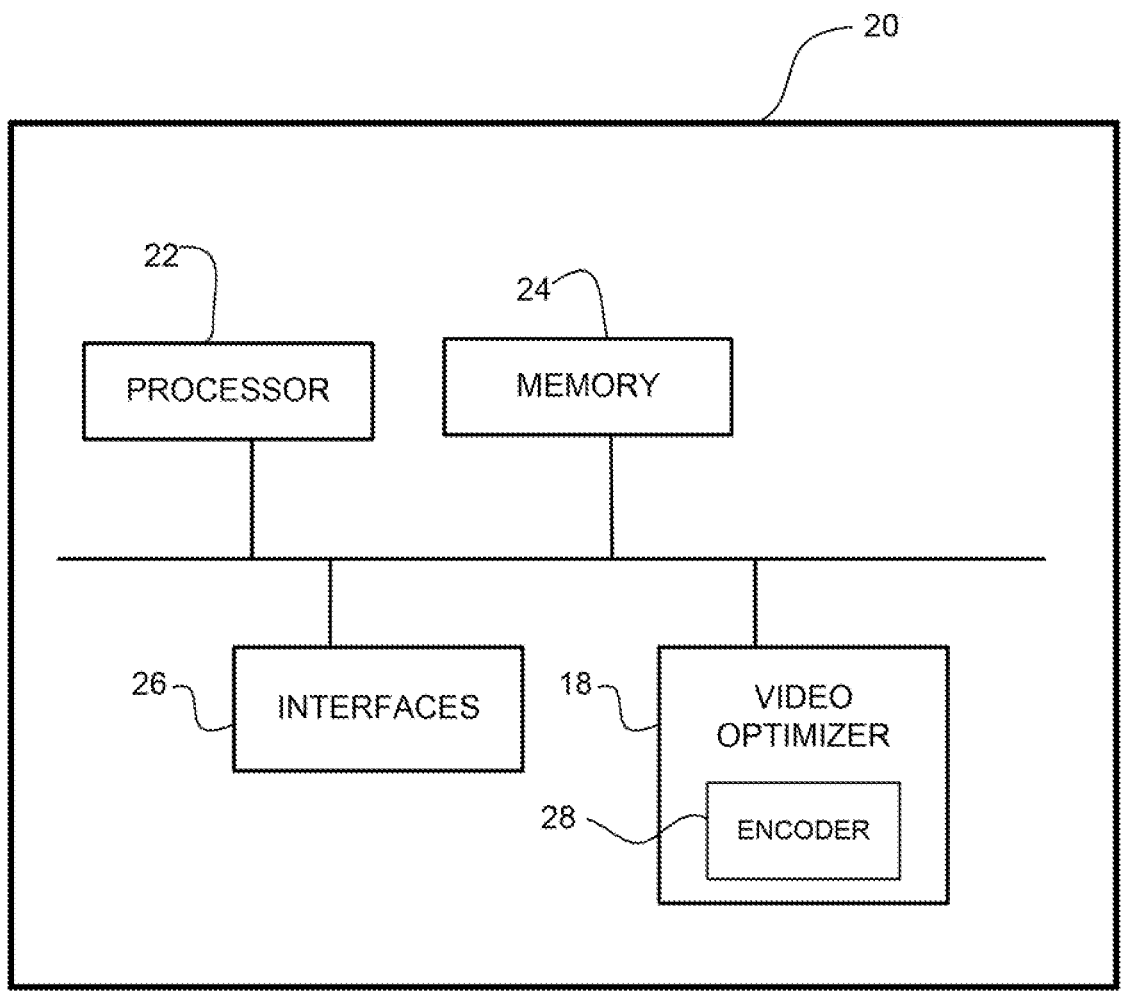
FIG. 2 depicts an example of a network device useful in implementing embodiments described herein.

FIG. 2 illustrates an example of a network device 20 (e.g., intermediate node) that may be used to implement the embodiments described herein. In one embodiment, the network device 20 is a programmable machine that may be implemented in hardware, software, or any combination thereof. The network device 20 includes one or more processor 22, memory 24, network interfaces 26, and video optimizer 18. As described above, the video optimizer 18 comprises a video encoder 28 (e.g., codec) for use in optimizing the video.

Memory 24 may be a volatile memory or non-volatile storage, which stores various applications, operating systems, modules, and data for execution and use by the processor 22. For example, the memory 24 may store video parameters for a session, for use in optimizing the video.

Logic may be encoded in one or more tangible media for execution by the processor 22. For example, the processor 22 may execute codes stored in a computer-readable medium such as memory 24. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The network interfaces 26 may comprise any number of wireless or wired interfaces (e.g., linecards, ports) for receiving data or transmitting data to other devices. The interfaces 26 may include, for example, a wired (first) network interface (e.g., Ethernet interface) for communication with the source 10. If the access point is integral with the network device, the network interfaces 26 include a wireless (second) network interface for communication with the receiver 12.

It is to be understood that the network device 20 shown in FIG. 2 and described above is only an example and that different configurations of network devices may be used. For example, the network device 20 may further include any suitable combination of hardware, software, algorithms, processors, devices, components, or elements operable to facilitate the capabilities described herein.

Figure 3:
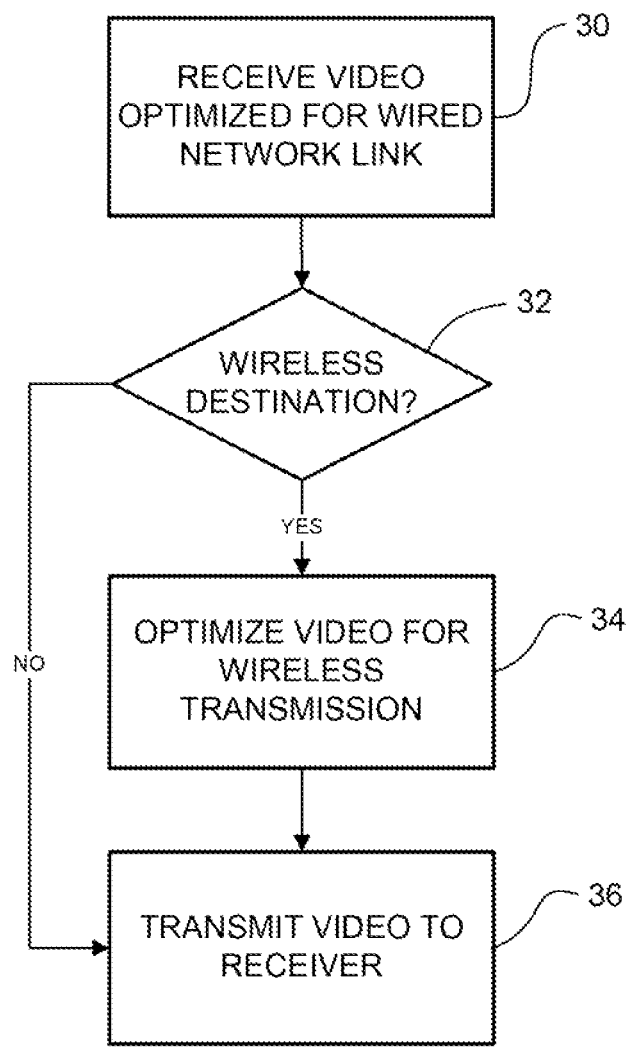
FIG. 3 is a flowchart illustrating an overview of a process for optimizing video for wireless delivery, in accordance with one embodiment.

FIG. 3 is a flowchart illustrating an overview of a process for optimizing network video for wireless delivery, in accordance with one embodiment. At step 30, a network device (e.g., intermediate node 15 in FIG. 1) receives video optimized for delivery via a highly bandwidth constrained connection (e.g., wired WAN link) from source 10. The intermediate node 15 may observe that the video parameters for the flow have been selected so as to optimize the video delivery over the bandwidth constrained connection. The intermediate node 15 determines if the receiver 12 is a wireless device (step 32). The intermediate node 15 may identify the receiver as a wireless device, for example, by looking at the IP (Internet Protocol) address of the destination (receiver). If the IP address is within a range of IP addresses assigned to a wireless subnet, then the intermediate node identifies the receiver 12 as a wireless device. The intermediate node 15 may also send a query to the access point 17 to determine if the destination is a wireless device. If the intermediate node 15 is integral with the access point 17, then the intermediate node will identify the receiver as a wireless device if the access point is used to forward the video. Thus, identifying the receiver 12 as a wireless device may also comprise identifying a wireless network segment within the network path between the intermediate node 15 and receiver 12.

If the destination is not a wireless device, the intermediate node 15 transmits the video in its received format, without optimizing the video for wireless delivery (steps 32 and 36). If the intermediate node 15 identifies the destination as a wireless device, the node optimizes the video for wireless delivery (step 34). As described above, the intermediate node 15 may format or encode the video to protect the video from wireless data loss over the wireless segment (e.g., final Wi-Fi leg) to the receiver 12. The intermediate node 15 forwards the video optimized for wireless transmission to the receiver (step 36). As shown in FIG. 1, transmitting the video to the receiver 12 may include transmitting the receiver to a node (e.g., access point 17) in the communication path to the receiver 12.

It is to be understood that the process shown in FIG. 3 and described above is only an example and that steps may be added or modified without departing from the scope of the embodiments.

Although the method, apparatus, and system have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
    receiving at an intermediate network device interposed in a network path between a source and a receiver, video optimized for a wired network link located between the source and the network device;
    determining at the intermediate network device if the receiver is a wireless device operating in a wireless network; and
    if the receiver is a wireless device, identifying at the intermediate network device, video parameters used by the source to optimize the video for transmission over the wired network link and determining if said video parameters are optimal for wireless transmission in the wireless network, optimizing the video for said wireless transmission if said video parameters are not optimal for wireless transmission, and transmitting the video to the receiver;
    if the receiver is not a wireless device, transmitting the video from the intermediate network device to the receiver in its received format;
    wherein optimizing comprises reformatting or re-encoding the video for transmission over the wireless network to add greater protection and quality of experience in the expectation that wireless data loss may occur.

2. The method of claim 1 wherein optimizing the video comprises encoding the video for transmission over a wireless network.

3. The method of claim 1 wherein receiving the video comprises receiving the video over a bandwidth constrained wide area network link.

4. The method of claim 1 wherein the intermediate network device comprises a router in communication with an access point in wireless communication with the receiver.

5. The method of claim 1 wherein optimizing the video comprises reducing interframe dependency.

6. The method of claim 1 wherein optimizing the video comprises adding redundant copies of critical video packets.

7. An apparatus comprising:
    a processor for processing at an intermediate network device, video received from a source on a wired network link and optimized for transmission on the wired network link, and determining if a receiver of the video is a wireless device in a wireless network, and if the receiver is a wireless device, identifying video parameters used by the source to optimize the video for transmission over the wired network link and determining if said video parameters are optimal for wireless transmission in the wireless network;
    a video encoder for optimizing the video for said wireless transmission if said video parameters are not optimal for wireless transmission; and
    a transmitter for transmitting the optimized video or the video in its received format if the receiver is not a wireless device;
    wherein optimizing comprises reformatting or re-encoding the video for transmission over the wireless network to add greater protection and quality of experience in the expectation that wireless data loss may occur.

8. The apparatus of claim 7 wherein the apparatus comprises a router.

9. The apparatus of claim 7 wherein the apparatus is configured for operation as an access point for wireless communication with the receiver.

10. The apparatus of claim 7 wherein the video encoder is configured to reduce interframe dependency of the video.

11. The apparatus of claim 7 wherein the video encoder is configured to add redundant copies of critical video packets.

12. The apparatus of claim 7 wherein the video encoder is configured to add forward error correction to the video.

13. An apparatus comprising:
    a wired network interface for receiving video optimized for a wired network link from a source;
    a video optimizer for identifying video parameters used by the source to optimize the video for transmission over the wired network link, determining that said video parameters are not optimal for wireless transmission in the wireless network, and optimizing the video for said wireless transmission if it is determined that the receiver is a wireless device operating in a wireless network; and a second network interface for transmitting the video optimized for said wireless transmission to the receiver or transmitting the video to the receiver in its received format if the receiver is not a wireless device;

wherein optimizing comprises reformatting or re-encoding the video for transmission over the wireless network to add greater protection and quality of experience in the expectation that wireless data loss may occur.

14. The apparatus of claim 13 wherein the second network interface is configured for communication with an access point.

15. The apparatus of claim 13 wherein the second network interface comprises a wireless interface for communication with the receiver.

16. The apparatus of claim 13 wherein the apparatus is configured for communication with the source over a bandwidth constrained wide area network link.

17. The apparatus of claim 13 wherein the video optimizer is configured to protect the video from data loss.

18. The method of claim 1 wherein the intermediate network device comprises an access point in wireless communication with the receiver.

19. The apparatus of claim 7 wherein the apparatus comprises an access point operable for wireless communication with the receiver.

20. The apparatus of claim 13 wherein the apparatus comprises an access point operable for wireless communication with the receiver.

* * * * *